US008537745B2

(12) United States Patent
Rimini

(10) Patent No.: US 8,537,745 B2
(45) Date of Patent: Sep. 17, 2013

(54) MULTIPLEXING ARRANGEMENTS FOR MULTIPLE RECEIVE ANTENNAS

(75) Inventor: Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 904 days.

(21) Appl. No.: 12/476,167

(22) Filed: Jun. 1, 2009

(65) Prior Publication Data

US 2009/0296666 A1 Dec. 3, 2009

Related U.S. Application Data

(60) Provisional application No. 61/058,159, filed on Jun. 2, 2008.

(51) Int. Cl.
  *H04W 52/42* (2009.01)
(52) U.S. Cl.
  USPC .......................................... 370/328; 375/141
(58) Field of Classification Search
  None
  See application file for complete search history.

(56) References Cited

U.S. PATENT DOCUMENTS

| 5,608,722 | A | 3/1997 | Miller | |
|---|---|---|---|---|
| 5,614,910 | A * | 3/1997 | Bradley et al. | 342/119 |
| 6,177,906 | B1 * | 1/2001 | Petrus | 342/378 |
| 6,611,758 | B1 * | 8/2003 | Nysen | 701/300 |
| 6,735,421 | B1 | 5/2004 | Claxton et al. | |
| 6,985,516 | B1 | 1/2006 | Easton et al. | |
| 7,263,146 | B2 | 8/2007 | Van Rooyen | |
| 7,440,491 | B2 * | 10/2008 | Balakrishnan et al. | 375/148 |
| 2001/0050926 | A1 * | 12/2001 | Kumar | 370/529 |
| 2004/0213351 | A1 * | 10/2004 | Shattil | 375/260 |
| 2005/0259006 | A1 * | 11/2005 | Kim et al. | 342/377 |
| 2007/0291823 | A1 * | 12/2007 | Ben-Bassat | 375/141 |
| 2008/0020721 | A9 * | 1/2008 | Morris et al. | 455/103 |

FOREIGN PATENT DOCUMENTS

| JP | H10509848 A | 9/1998 |
|---|---|---|
| JP | 2002076972 A | 3/2002 |
| JP | 2005514816 A | 5/2005 |
| JP | 2005522909 A | 7/2005 |
| JP | 2007531352 A | 11/2007 |
| KR | 20040108714 | 12/2004 |
| RU | 2156033 C2 | 9/2000 |
| RU | 2301493 | 6/2007 |
| TW | 200810444 A | 2/2008 |
| WO | 9631960 A1 | 10/1996 |
| WO | 0163779 A2 | 8/2001 |
| WO | 0245288 A2 | 6/2002 |
| WO | 03003613 A1 | 1/2003 |
| WO | 03055207 A1 | 7/2003 |
| WO | 03085859 A1 | 10/2003 |
| WO | 2005099128 A1 | 10/2005 |

OTHER PUBLICATIONS

International Search Report and Written Opinion—PCT/US2009/046007—ISA/EPO—Nov. 19, 2009.

(Continued)

*Primary Examiner* — Hassan Kizou
*Assistant Examiner* — Roberta A Shand
(74) *Attorney, Agent, or Firm* — Paul Kuo

(57) ABSTRACT

A method and apparatus processes a plurality of analog signals in a transceiver with multiple receive (Rx) antennas in a wireless communication system. By appropriate combining of the analog signals of each Rx antenna, this scheme allows a reduction in the number of the front end components, for example, filters, mixers and Analog to Digital Converter (ADC) devices. Subsequently, the signals are separated digitally by virtue of their unique code. The benefits associated with this scheme are at least threefold: reduced cost, area, and power consumption of a multiple antenna terminal. Additionally, proper parameter settings increase signal to Quantization Noise Ratio (SQNR) at the ADC output.

34 Claims, 15 Drawing Sheets

OTHER PUBLICATIONS

Taiwan Search Report—TW098118268—TIPO—Jul. 24, 2012.
Tzeng F., et al., "PHY 24-1—A Universal Code-Modulated Path-Sharing Multi-Antenna Receiver", Wireless Communications and Networking Conference, 2008. WCNC 2008. IEEE, IEEE, Piscataway, NJ, USA, Mar. 31, 2008, pp. 616-621, XP031243699 ISBN: 978-1-4244-1997-5 the whole document.

* cited by examiner

MULTIPLEXING ARRANGEMENTS FOR MULTIPLE RECEIVE ANTENNAS

CLAIM OF PRIORITY UNDER 35 U.S.C. §119

The present application for patent claims priority to Provisional Application No. 61/058,159 entitled "MULTIPLEXING ARRANGEMENTS FOR MULTIPLE RECEIVE ANTENNAS" filed Jun. 2, 2008, and assigned to the assignee hereof and hereby expressly incorporated by reference herein.

BACKGROUND

Field

The present disclosure relates generally to communication and more specifically to techniques for wirelessly receiving data packet communication at a plurality of receive (Rx) antennas.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Mobile devices increasingly have multiple receiver chains. Each antenna has a radio frequency (RF) front end amplification and filtering, demodulation, separate digitizing, and digital decoding. Thereby, a mobile device is capable of advantageously monitoring multiple base stations, achieving an antenna gain through spatial diversity, or performing multiple channel communication with the same base station. While the additional operating capabilities are desirable, adding separate receive chains increases the size, cost and complexity of the mobile device. For example, each chain has to have a dedicated analog-to-digital converter (ADC) with requisite pre-filtering, gain control, and post filtering.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with Analog signals of different receive antenna (Rx) branches that are combined prior to the Analog to Digital Converter (ADC) by Analog Code Division Multiplexing (ACDM). By appropriately combining the analog signals of each Rx antenna, these front end components of filters, mixers and ADC devices can be reduced. The benefits associated with this scheme are at least threefold: reduced cost, area and power consumption of a multi-antenna terminal. Additionally, proper parameter settings improve Signal to Quantization Noise Ratio (SQNR) at the ADC output. Utilizing Code Division Multiplexing (CDM) approach to multiplex different analog signals allows converging processing of multiple Radio Frequency (RF) receiver chains to a single chain. Subsequently, the signals are separated digitally by virtue of their unique orthogonal code.

In one aspect, a methodology is provided for receiving wireless communication at a plurality of receive antennas. At each of a plurality of antennas, a data packet communication signal modulated on a radio frequency (RF) carrier frequency is received. At a corresponding plurality of receive chains for each of the plurality of antennas, the received data packet communication signals are processed to produce a plurality of analog signals. A sampled and hold analog signal is produced respectively for each of the plurality of analog signals. Each sampled and hold analog signal is spread with a unique spreading code. Each spread sampled and held analog signal is combined to produce a single analog signal. A digital version of the single analog signal is generated to produce a combined digital signal. The digital version is despread to produce a digital replica of each data packet communication signal.

In another aspect, an apparatus is provided for receiving wireless communication at a plurality of receive antennas. Means are provided for receiving at each of a plurality of antennas a data packet communication signal modulated on a radio frequency (RF) carrier frequency. Means are provided for processing at a corresponding plurality of receive chains for each of the plurality of antennas the received data packet communication signals to produce a plurality of analog signals Means are provided for producing a sampled and held analog signal respectively for each of the plurality of analog signals. Means are provided for spreading each sampled and held analog signal with a unique spreading code. Means are provided for combining each spread sampled and held analog signal to produce a single analog signal. Means are provided for generating a digital version of the single analog signal to produce a combined digital signal. Means are provided for despreading the digital version to produce a digital replica of each data packet communication signal.

In an additional aspect, an apparatus is provided for receiving wireless communication at a plurality of receive antennas. A plurality of receivers is for receiving data packet communication signal modulated on a radio frequency (RF) carrier frequency. A plurality of receive chains corresponding to the plurality of antennas is for processing the received data packet communication signals to produce a plurality of analog signals. One of a plurality of sample and hold circuitry is for producing a sampled and held analog signal respectively for each of the plurality of analog signals. A code spreading component is for spreading each sampled and held analog signal with a unique spreading code. A summer is for combining each spread sampled and held analog signal to produce a single analog signal. An analog-to-digital converter is for generating a digital version of the single analog signal to produce a combined digital signal. A bank of correlators is for despreading the digital version to produce a digital replica of each data packet communication signal.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

A method and apparatus process a plurality of analog signals in a transceiver with multiple receive (Rx) antennas in a wireless communication system utilizing spatial diversity. By appropriate combining of the analog signals of each Rx antenna, this scheme allows a reduction in the number of the front end components, for example, filters, mixers and Analog to Digital Converter (ADC) devices. Subsequently, the signals are separated digitally by virtue of their unique code. The benefits associated with this scheme are at least threefold: reduced cost, area, and power consumption of a multiple antenna terminal. Additionally, proper parameter settings increase signal to Quantization Noise Ratio (SQNR) at the ADC output.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
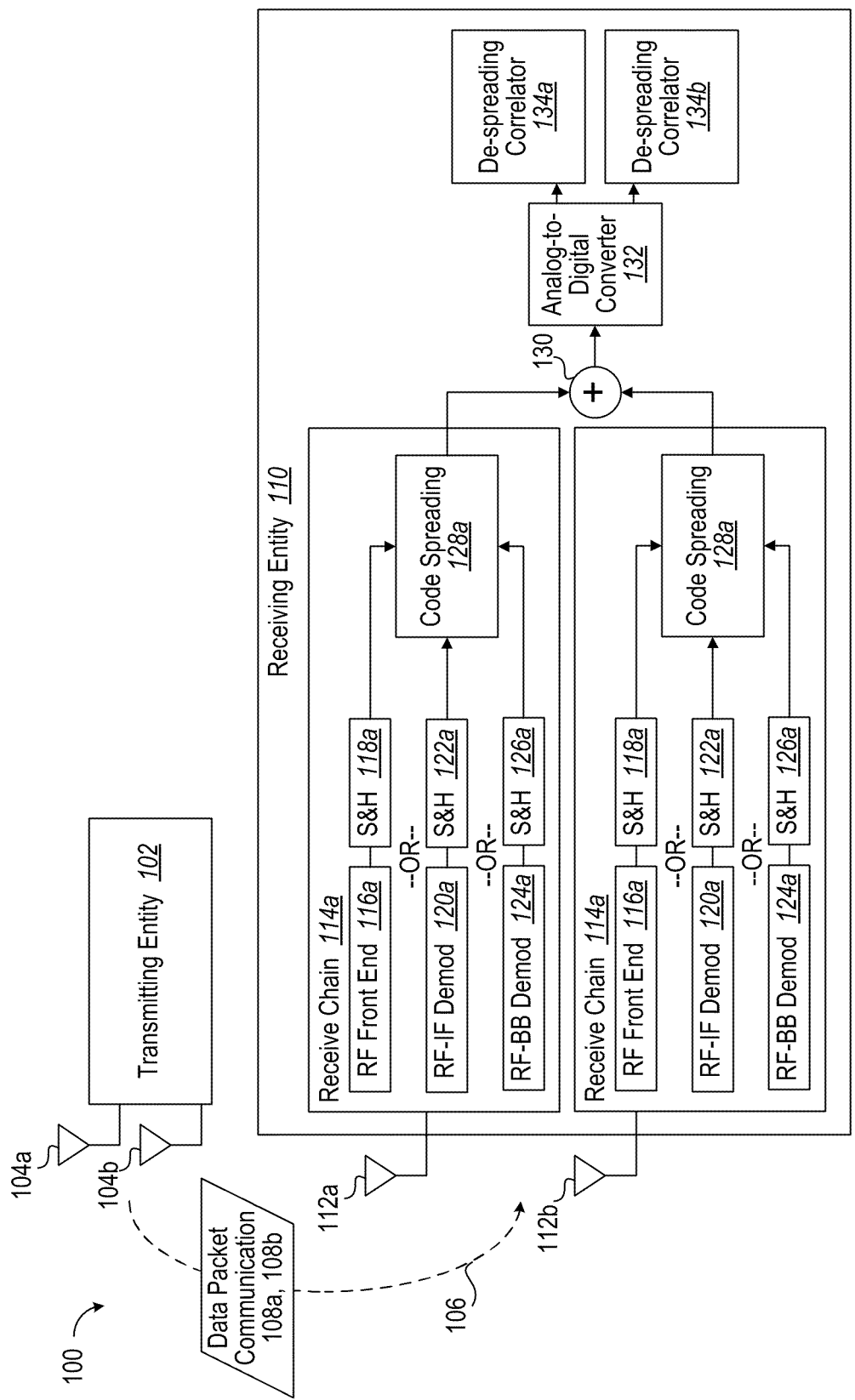
FIG. 1 depicts a block diagram of a wireless communication system in which a data packet communication signal is received by multiple antennas of a receiving entity.

With reference to FIG. 1, a communication system 100 has a transmitting entity 102 that transmits from a plurality of transmit (Tx) antennas 104a, 104b on an air link 106 respective data packet communication signals 108a, 108b modulated on a radio frequency (RF) carrier frequency and separately possibly, but not necessarily, encoded for spatial diversity. A receiving entity 110 has a plurality of receive (Rx) antennas 112a, 112b each connected to a separate Receive chain 114a, 114b that perform RF processing.

For instance, an RF front end 116a, 116b can comprise low noise amplification and filtering used prior to respective sample and hold circuitry 118a, 118b performs sampling at a rate of at least twice the RF carrier frequency. Alternatively, radio frequency to intermediate frequency (RF-IF) demodulators 120a, 120b prepares the signals for respective sample and hold circuitry 122a, 122b at a sampling rate of at least twice the IF. As another alternative, the RF processing can entail radio frequency to base band (RF-BB) demodulators 124a, 124b that prepares the received signals for respective sample and hold circuitry 126a, 126b at a sample rate sufficient for the data rate.

Each sample and hold analog signal is spread with a unique spreading code mixer 128a, 128b and combined at a summer 130. An analog-to-digital converter (ADC) 132 produces a digital version. The digital version is despread by respective digital correlators 134a, 134b to produce a digital replica of each data packet communication signal.

Figure 2:
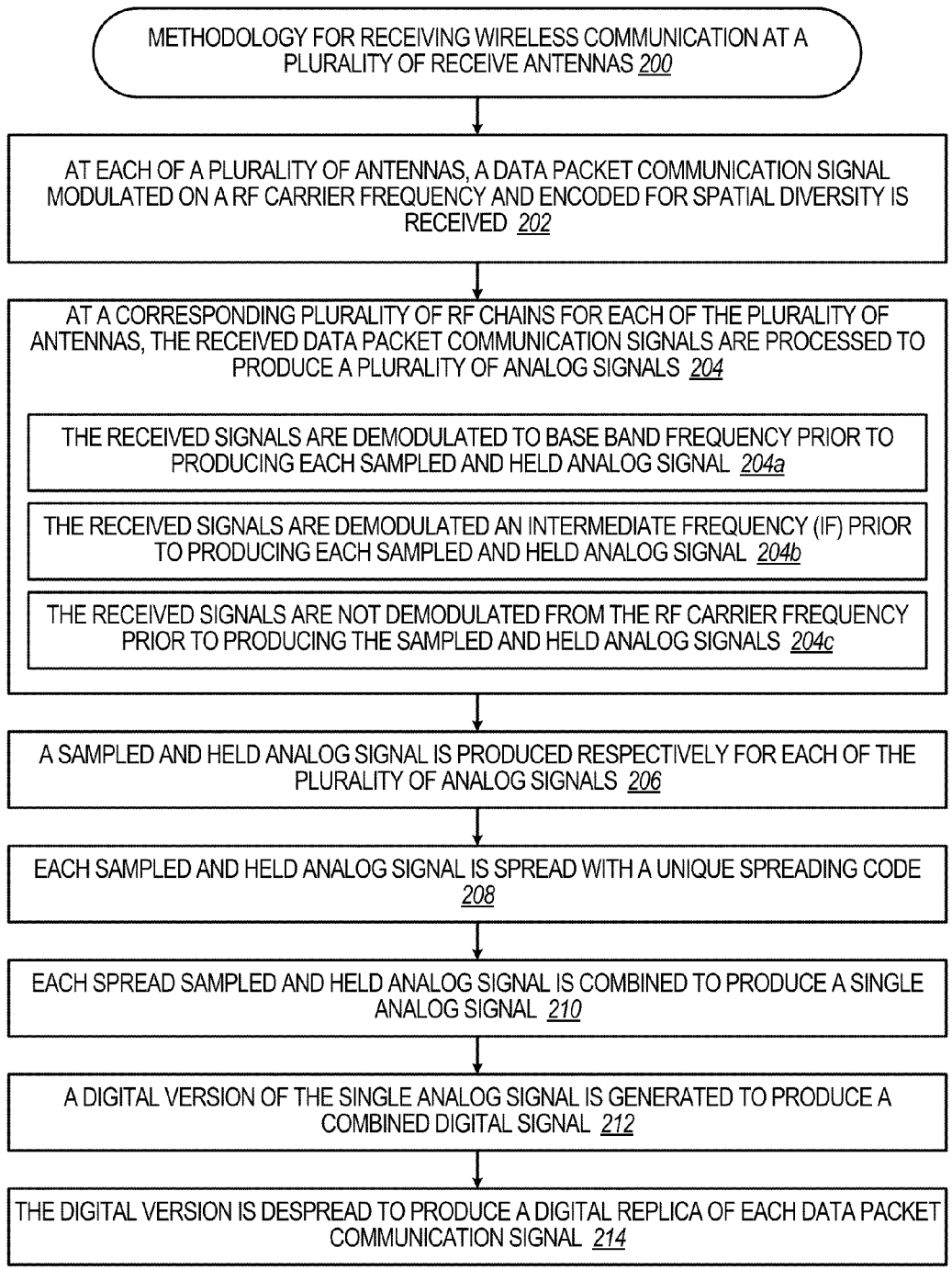
FIG. 2 depicts a flow diagram for a methodology or sequence of operations for receiving wireless communication at a plurality of receive antennas.

In FIG. 2, a methodology or sequence of operations 200 is provided for receiving wireless communication at a plurality of receive antennas. At each of a plurality of antennas, a data packet communication signal modulated on a radio frequency (RF) carrier frequency and possibly, but not necessarily, encoded for spatial diversity is received (block 202). At a corresponding plurality of receive chains for each of the plurality of antennas, the received data packet communication signals are processed to produce a plurality of analog signals (block 204). A sampled and held analog signal is produced respectively for each of the plurality of analog signals (block 206). Each sampled and held analog signal is spread with a unique spreading code (block 208). Each spread sampled and held analog signal is combined to produce a single analog signal (block 210). A digital version of the single analog signal is generated to produce a combined digital signal (block 212). The digital version is despread to produce a digital replica of each data packet communication signal (block 214).

In one aspect, the received signals are demodulated to base band frequency prior to producing each sampled and held analog signal (block 204*a*). Alternatively, the received signals are demodulated an intermediate frequency (IF) prior to producing each sampled and held analog signal (block 204*b*). As another alternative, the received signals are not demodulated from the RF carrier frequency prior to producing the sampled and held analog signals (block 204*c*).

Figure 3:
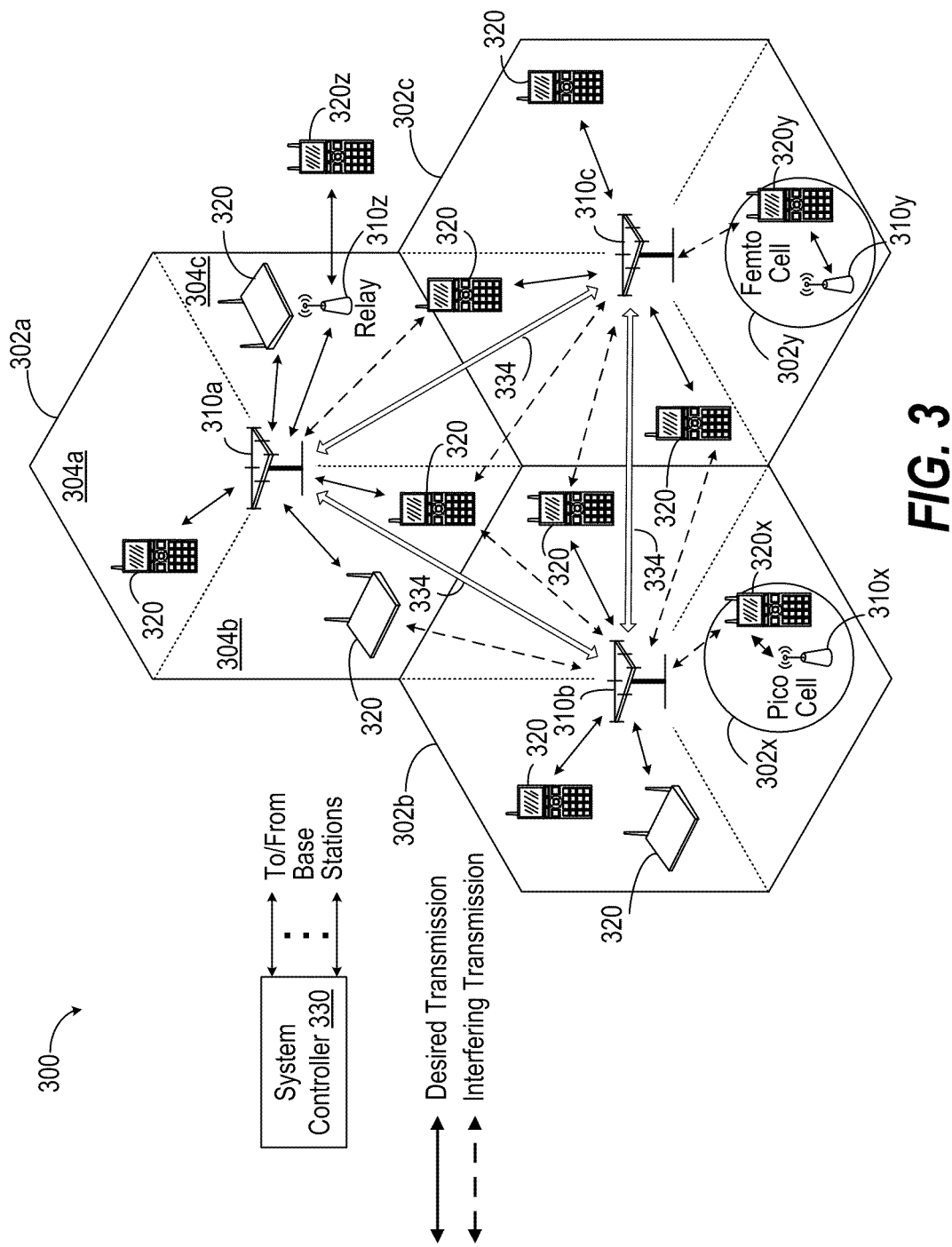
FIG. 3 depicts a block diagram of base stations serving and interfering with a population of terminals.

In the example shown in FIG. 3, base stations 310*a*, 310*b* and 310*c* may be macro base stations for macro cells 302*a*, 302*b* and 302*c*, respectively. Base station 310*x* may be a pico base station for a pico cell 302*x* communicating with terminal 320*x*. Base station 310*y* may be a femto base station for a femto cell 302*y* communicating with terminal 320*y*. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310*z* that communicates with terminal 320*z*. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310*a*-310*c* employing such a distributed architecture. Base stations 310*a*-310*c* may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 3 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302*a*, 302*b*, or 302*c* corresponding to a respective base station 310*a*-310*c* can be partitioned into multiple smaller areas (e.g., areas 304*a*, 304*b*, and 304*c*). Each of the smaller areas 304*a*, 304*b*, and 304*c* can be served by a respective base transceiver subsystem (BTS, not shown). As used herein and generally in the art, the term "sector" can refer to a BTS and/or its coverage area depending on the context in which the term is used. In one example, sectors 304*a*, 304*b*, 304*c* in a cell 302*a*, 302*b*, 302*c* can be formed by groups of antennas (not shown) at base station 310, where each group of antennas is responsible for communication with terminals 320 in a portion of the cell 302*a*, 302*b*, or 302*c*. For example, a base station 310 serving cell 302*a* can have a first antenna group corresponding to sector 304*a*, a second antenna group corresponding to sector 304*b*, and a third antenna group corresponding to sector 304*c*. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
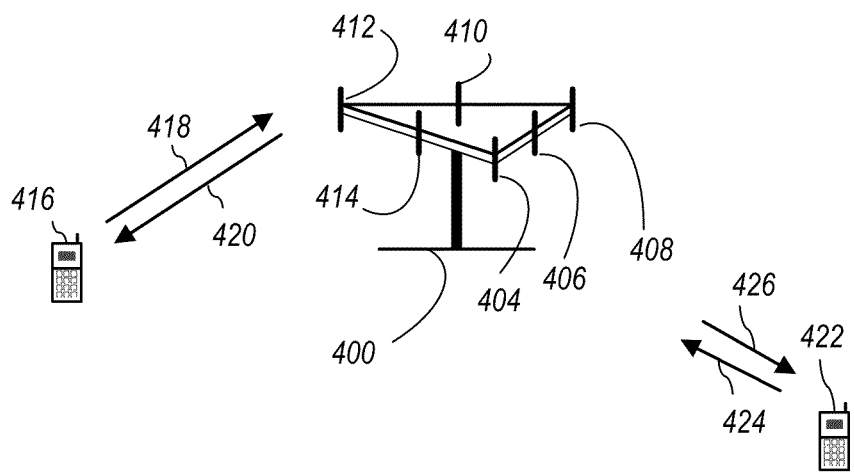
FIG. 4 depicts a block diagram of a multiple access wireless communication system.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group.

Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 5:
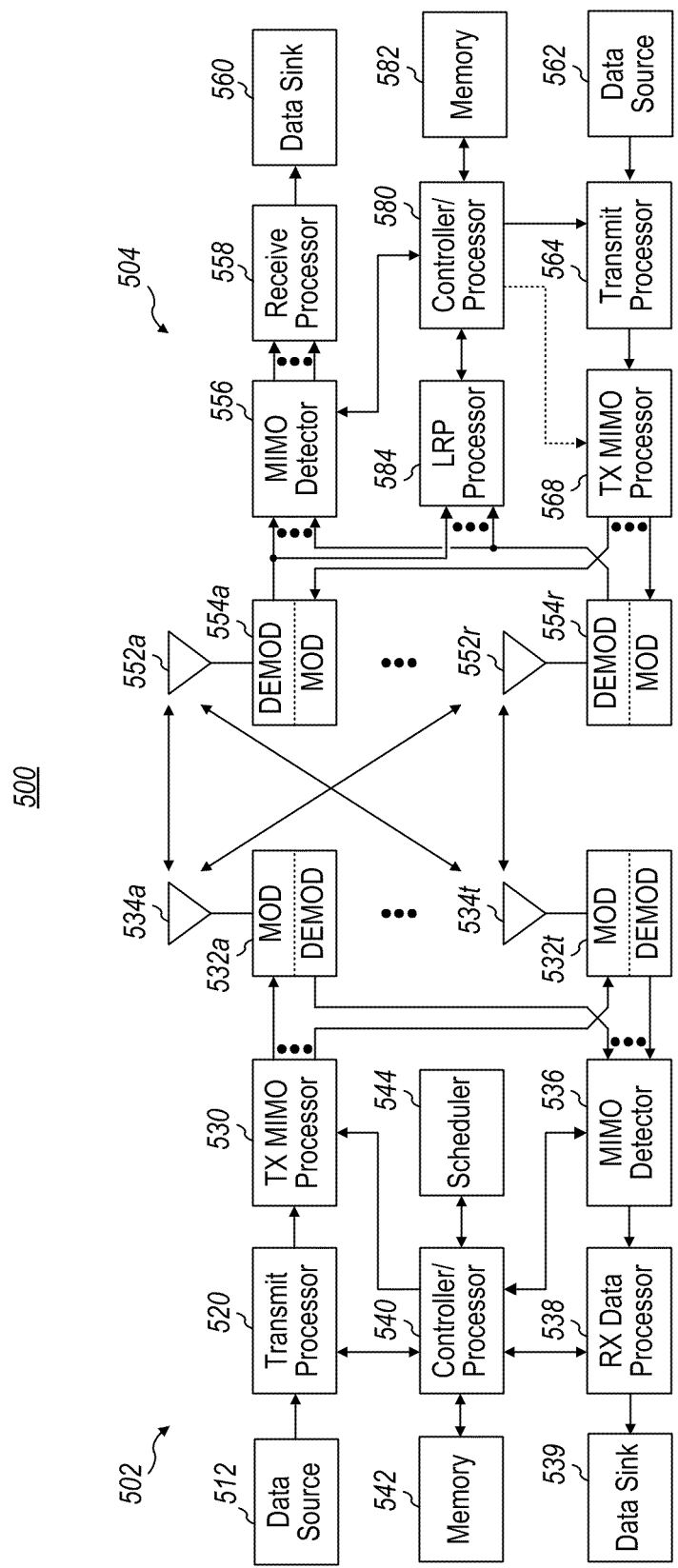
FIG. 5 depicts a block diagram of a communication system between a base station and a terminal.

FIG. 5 shows a block diagram of a design of a communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general T≧1 and R≧1.

At base station 502, a transmit processor 520 may receive traffic data from a data source 512 and messages from a controller/processor 540. Transmit processor 520 may process (e.g., encode, interleave, and modulate) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., precoding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect for low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 568 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive data processor 538 to obtain the decoded packets and messages transmitted by terminal 504 for providing to a data sink 539.

Controllers/processors 540 and 580 may direct the operation at base station 502 and terminal 504, respectively. Processor 540 and/or other processors and modules at base station 502 may perform or direct processes for the techniques described herein. Processor 584 and/or other processors and modules at terminal 504 may perform or direct processes for the techniques described herein. Memories 542 and 582 may store data and program codes for base station 502 and terminal 504, respectively. A scheduler 544 may schedule terminals for data transmission on the downlink and/or uplink and may provide resource grants for the scheduled terminals.

Figure 6:
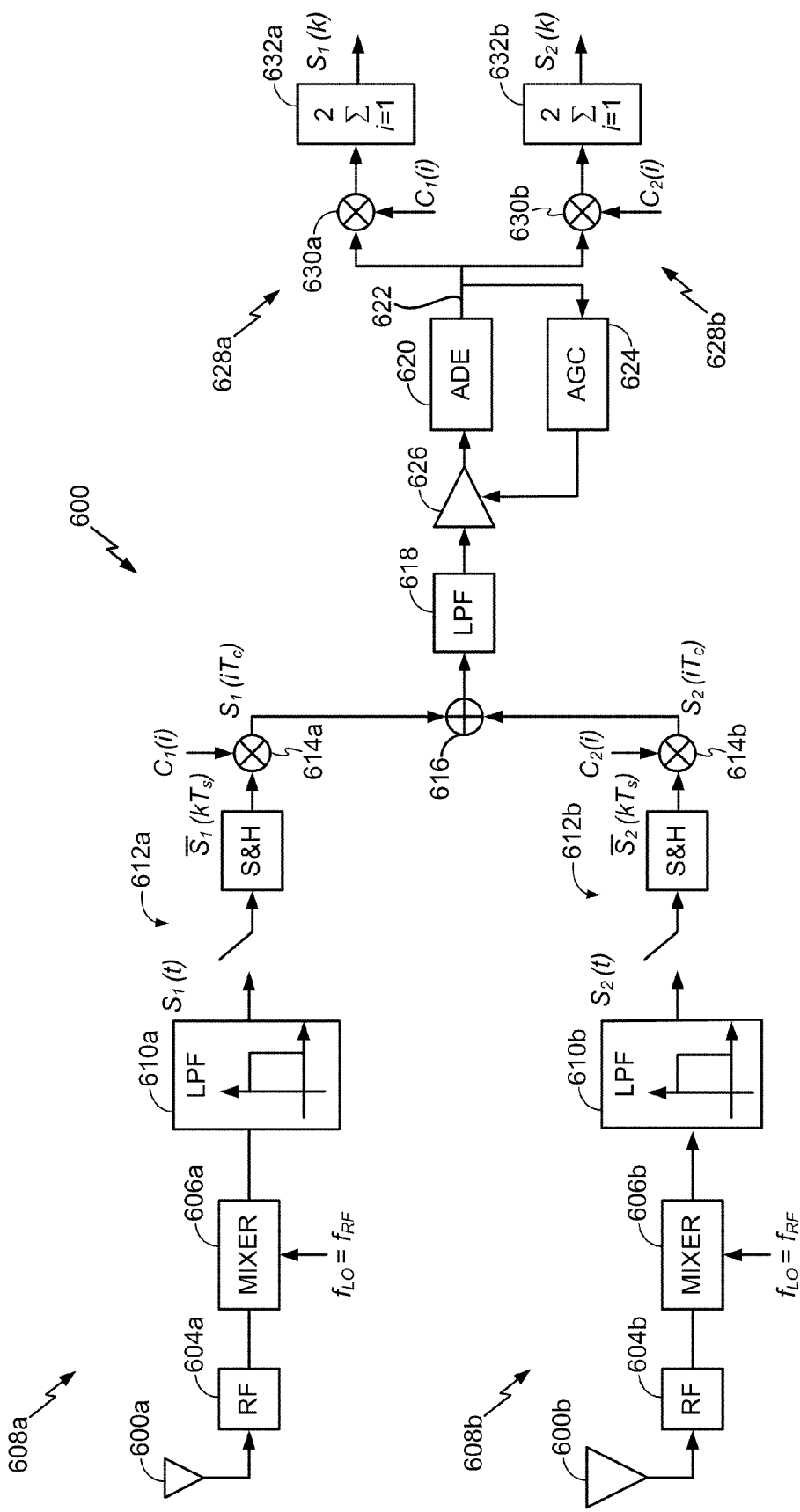
FIG. 6. depicts a block diagram of a receiving entity having multiple receive chains that are orthogonally spread in base band and combined for digital processing and subsequent de-spreading.

To that end, FIG. 6 is a block diagram of a receiver 600 employing two receive antennas 602a, 602b in accordance with one aspect. Although two antennas are depicted for clarity, it should be appreciated with benefit of the present disclosure that the approach can be extended to support more than two antennas. Radio frequency (RF) receivers 604a, 604b amplify and bandpass filter about a carrier frequency $f_{RF}$ what is received by antennas 602a, 602b. A respective mixer 606a, 606b uses a local oscillator frequency $f_{LO}$ set to the carrier frequency $f_{RF}$ for down conversion to base band. Harmonics of each antenna branch 608a, 608b are removed by respective low pass filter (LPFs) 610a, 610b to produce band limited signals $s_i(t)$ (i=1, 2 . . . M) at Fs≧2B where B is the signal bandwidth and M is the number of antennas 602a, 602b. Respective sample and hold (S&H) circuitry 612a, 612b produce $S_1(kT_S)$, $S_2(kT_S)$ for spreading at 614a, 614b with orthogonal code signals $C_1(i)$, $C_2(i)$ of bandwidth M·B (M=2 for 2 antenna configuration), producing discrete analog signals $S_1(iT_C)$, $S_1(iT_C)$ that are summed together at 616. The spreading factor is denoted as.

$$\frac{T_s}{T_c}.$$

This combined signal is low pass filtered (LPF) at 618 and converted to digital format by a single analog-to-digital converter (ADC) 620. Closed loop feedback from the output 622 of the ADC 620 through an automatic gain control (AGC) 624 adjusts an amplifier 626 at the input to the ADC 620 for obtaining full resolution capability of the ADC 620.

The digitized signal at 622 is fed to a bank of correlators 628a, 628b (M=2 for two (2) antennas) that perform the de-spreading operation by correlating digitally with the same codes $C_1(i)$, $C_2(i)$ set used for the spreading operation, depicted respectively at 630a, 630b. The resultant digitized, base band signals are digitally integrated respectively at 632a, 632b to determine the originally transmitted information in digital form $S_1(k)$, $S_2(k)$ using techniques well known in the art. This scheme is referred to as Base Band Code Division Multiplexing (BB-CDM) since the multiplexing occurs at base band.

Figure 7:
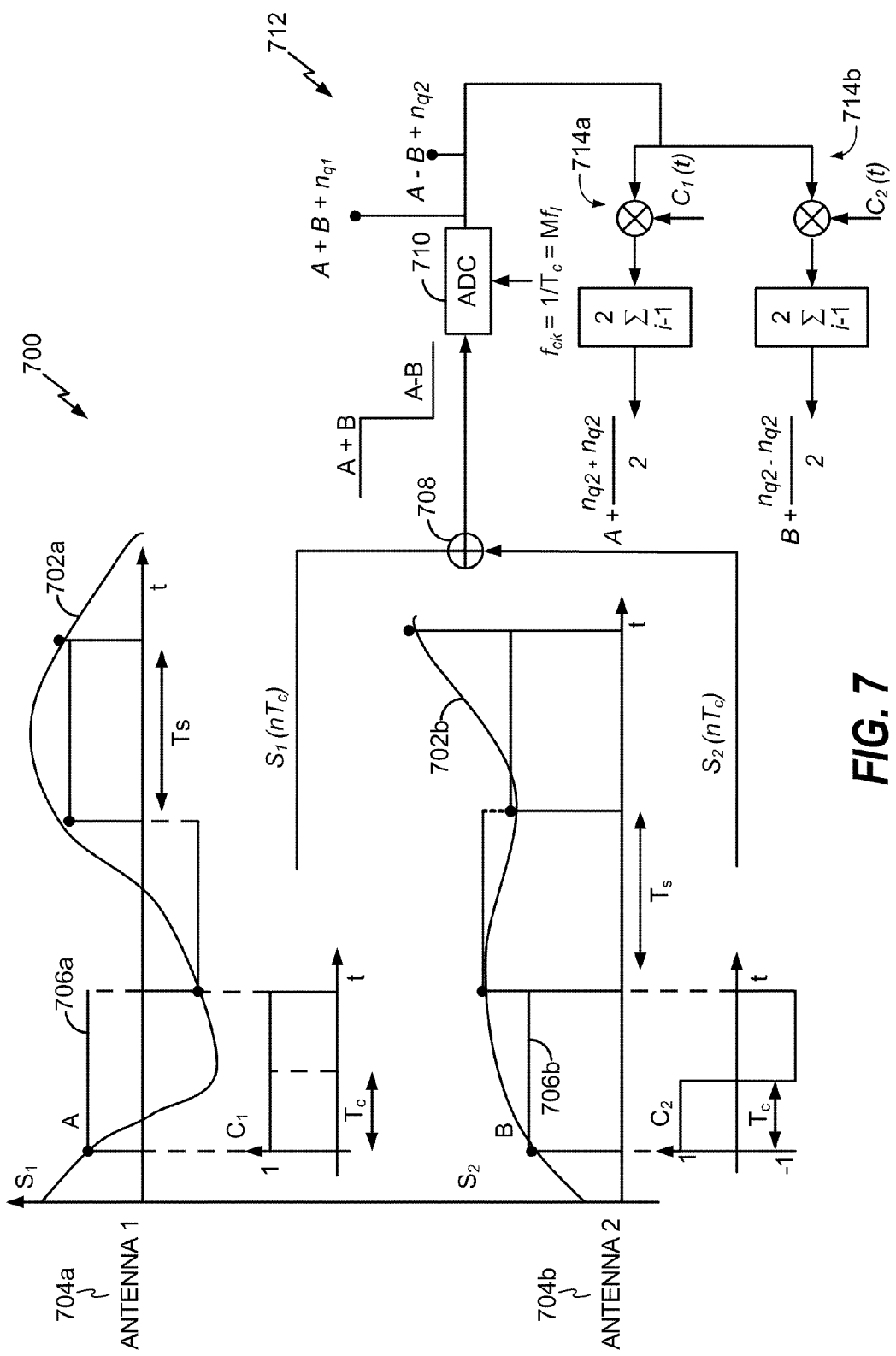
FIG. 7 depicts a block diagram with waveforms illustrating code division multiplexing in order to combine latter stages of multiple antenna receive chains.

In FIG. 7, the operations of spreading and dispreading circuitry 700 are further highlighted in a two (2) antenna configuration for zero intermediate frequency (ZIF). The signals $s_1(t)$ 702a and $s_2(t)$ 702b from antenna 1 and 2 704a, 704b respectively are sampled as depicted respectively 706a, 706b at sampling frequency fs=1/Ts=2B through the S&H devices (not shown). The resultant rectangular waveforms 706a, 706b of each branch are being multiplied by its associated spreading code $C_1$, $C_2$ to generate the spreading signals $s_1(nT_c)$, $s_2(nT_c)$. For the case of two (2) antennas 704a, 704b, Ts/Tc=2, in general Ts/Tc=M for M antennas. The spread signals $s_1(nT_c)$, $s_2(nT_c)$ of antenna 1 and 2 704a, 704b respectively are added at 708 and digitized through a single ADC 710. The output of the ADC 710 is comprised of the nominal sampled values superimposed by the quantization noise as depicted at 712. The quantized signal 712 is fed to a bank of digital correlators 714a, 714b that perform the de-spreading operation using a digital replica of the code sequences $c_1(n)$, $c_2(n)$ utilized for de-spreading. Given the orthogonality of the code sequences, the information pertaining to each signal can be fully retrieved. Additionally, the quantization noise power can be reduced by a factor of M in the de-spreading operation under the assumption that the quantization errors observed on the samples are uncorrelated.

Figure 8:
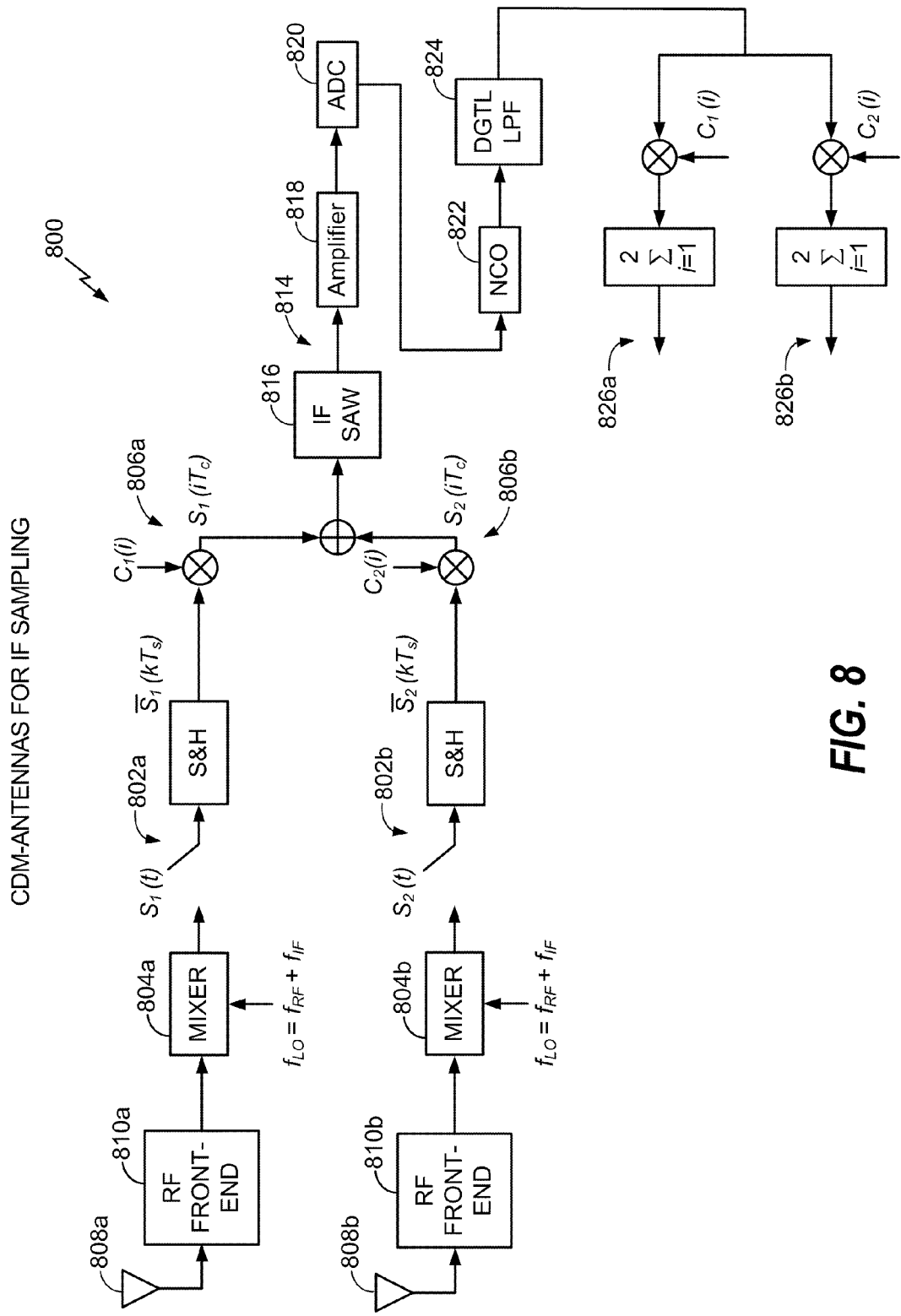
FIG. 8. depicts a block diagram of a receiving entity having multiple receive chains that are orthogonally spread in intermediate frequency and combined for digital processing and subsequent de-spreading.

In FIG. 8, in another aspect code division multiplexing can also be applied to several points along the Receive chain rather than at zero intermediate frequency (base band). To that end, spreading and dispreading circuitry 800 employing S&H devices 802a, 802b is applied at intermediate frequency (IF) right after a mixer stage 804a, 804b. Thereby, even greater advantages can be had. In fact, the different signals can now also share analog IF and BB filters and the amplification stages with their bandwidth can be adjusted according to the spreading factor. This aspect is referred to as IF Multiplexing.

In this case, the S&H circuitry is moved from base band (BB) to intermediate frequency (IF) and the spreading operation depicted respectively at 806a, 806b adjusted accordingly. In particular two or more antennas 808a, 808b receive data packet communication signals filtered at respective radio frequency (RF) front-ends 810a, 810b at the carrier frequency. By combining multiple antenna signals at IF as depicted at 812, it is possible to share a single IF to BB down conversion chain 814 of BW=2·B (in general BW=M·B) resulting in a savings of both analog filters, analog amplifiers/attenuators and digital circuitry. Specifically a single IF saw filter 816, a single amplifier stage 818, a single ADC 820, a single numerically controlled oscillator (NCO) 822 and a single digital low pass filter (LPF) 824 before diverging again into digital correlators 826a, 826b that perform the de-spreading operation. In other aspects, different combinations of the aforementioned components, as well as other components not mentioned herein, could be shared by multiple antennas 808a, 808b.

Figure 9:
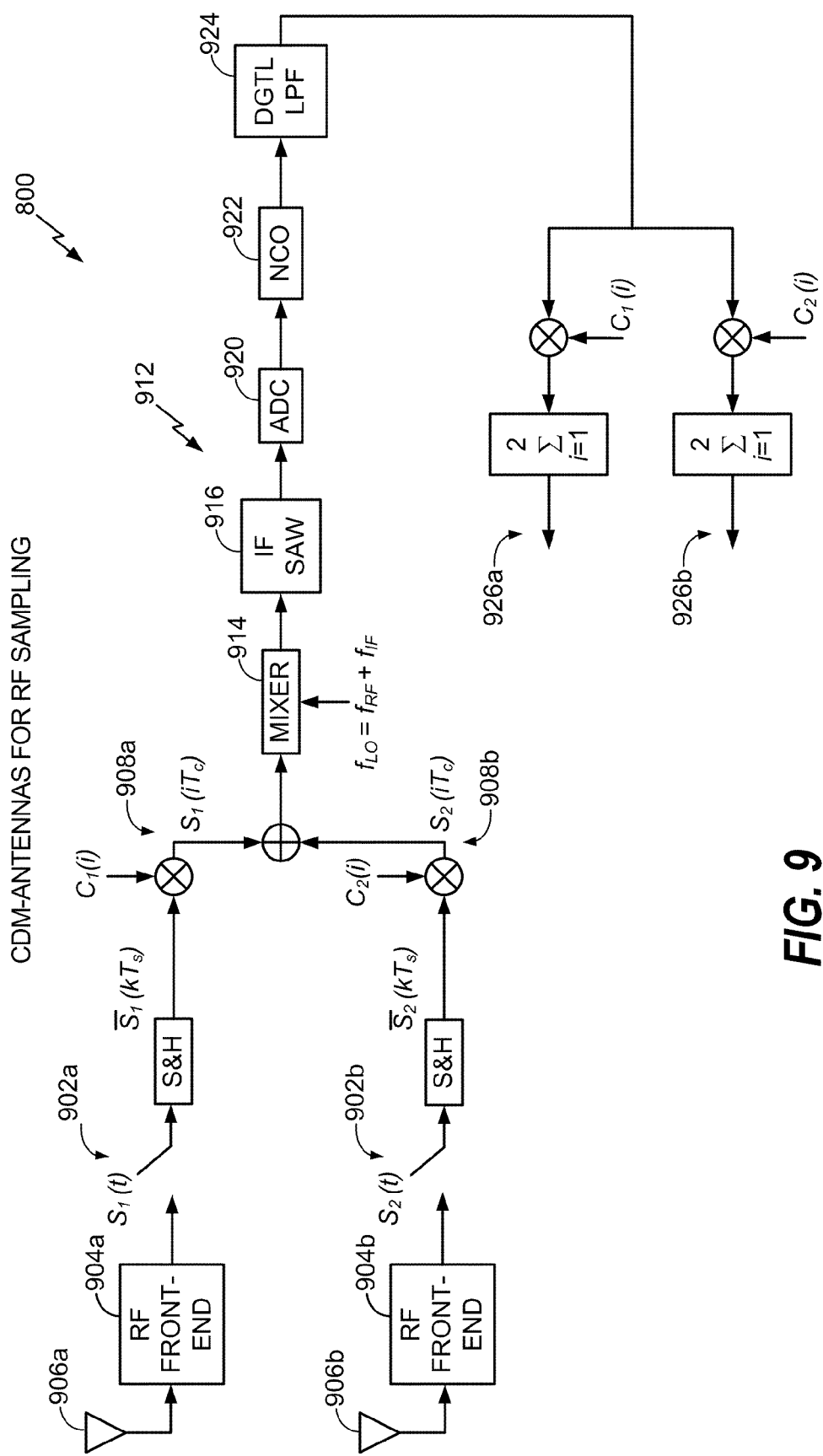
FIG. 9 depicts a block diagram of a receiving entity having multiple receive chains that are orthogonally spread in radio frequency and combined for digital processing and subsequent de-spreading.

Ultimately, an RF Multiplexing scheme can be implemented by moving the S&H device from IF to RF in a digital RF implementation where high sampling rates are utilized. FIG. 9 shows an exemplary architecture for RF-CDM multiplexing circuitry 900. For this configuration, the signals $s_1(t)$ and $s_2(t)$ are sampled by respective S&H circuitry 902a, 902b at RF right after the low-noise amplification (LNA) stages and band-pass filtering (BPF) filters, collectively depicted as RF front ends 904a, 904b fed from respective RF antennas 906a, 906b. By spreading depicted at 908a, 908b and combining the signals depicted at 910 fed to a single RF to BB down conversion chain 912 that uses a single mixer 914 along with the reuse factor already presented for the IF-CDM implementation. Specifically a single IF saw filter 916, a single ADC 920, a single numerically controlled oscillator (NCO) 922 and a single digital low pass filter (LPF) 924 before diverging again into digital correlators 926a, 926b that perform the de-spreading operation. This aspect could potentially provide even greater cost reduction by reducing the number of analog mixers along with filters and amplifiers, although it may translate into more stringent requirements for the ADC.

Although a code division multiplexing (CDM) has been described herein as an exemplary aspect, the multiplexing scheme can be extended to any form of orthogonal transformation, whether in time or in frequency. For example, the aspects presented herein are well suited for LTE 4G systems where the supported bandwidths scale as a factor of 2, for 5, 10, and 20 MHz. A 10 MHz system with 2 Rx antennas can be demodulated using the proposed CDM-MIMO approach reutilizing the 20 MHz system analog components already available.

Thus, frequency division multiplexing (FDM) can be used instead of code division multiplexing (CDM) to provide the orthogonality for combining signals received on different antennas for simultaneous sampling and processing. For instance, an alternative method based on FDM can be used to multiplex a plurality of signals impinging on several antennas. The FDM multiplexing can occur at base band (BB), intermediate frequency (IF) or radio frequency (RF) analogously to CDM approach by employing multiple frequency synthesizers and mixers, one for each receive antenna chain.

As a further alternative, time division multiplexing (TDM) can be used instead of CDM to provide the orthogonality for combining signals received on different antennas for simultaneous sampling and processing. In an aspect, a method based on TDM can be used to multiplex a plurality of signals impinging on several antennas. The TDM multiplexing can occur at BB, IF of RF analogously to CDM approach. The TDM approach uses buffering of the sampled data in analog domain prior to multiplexing.

Figure 10:
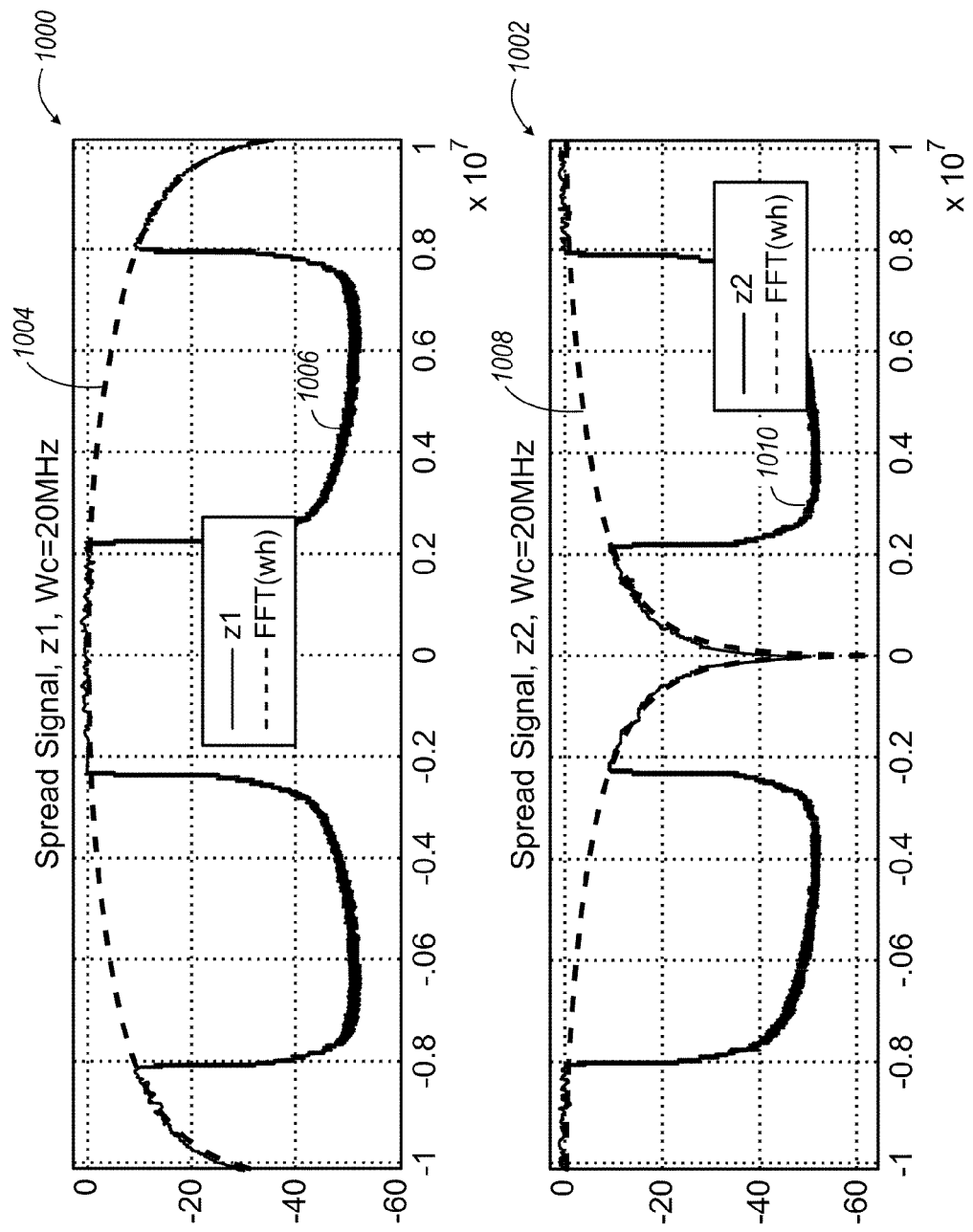
FIG. 10 depicts plots of spread spectrum after Walsh spreading for z1 signal and its Fast Fourier Transform (FFT) and for z2 signal and its FFT.
Figure 11:
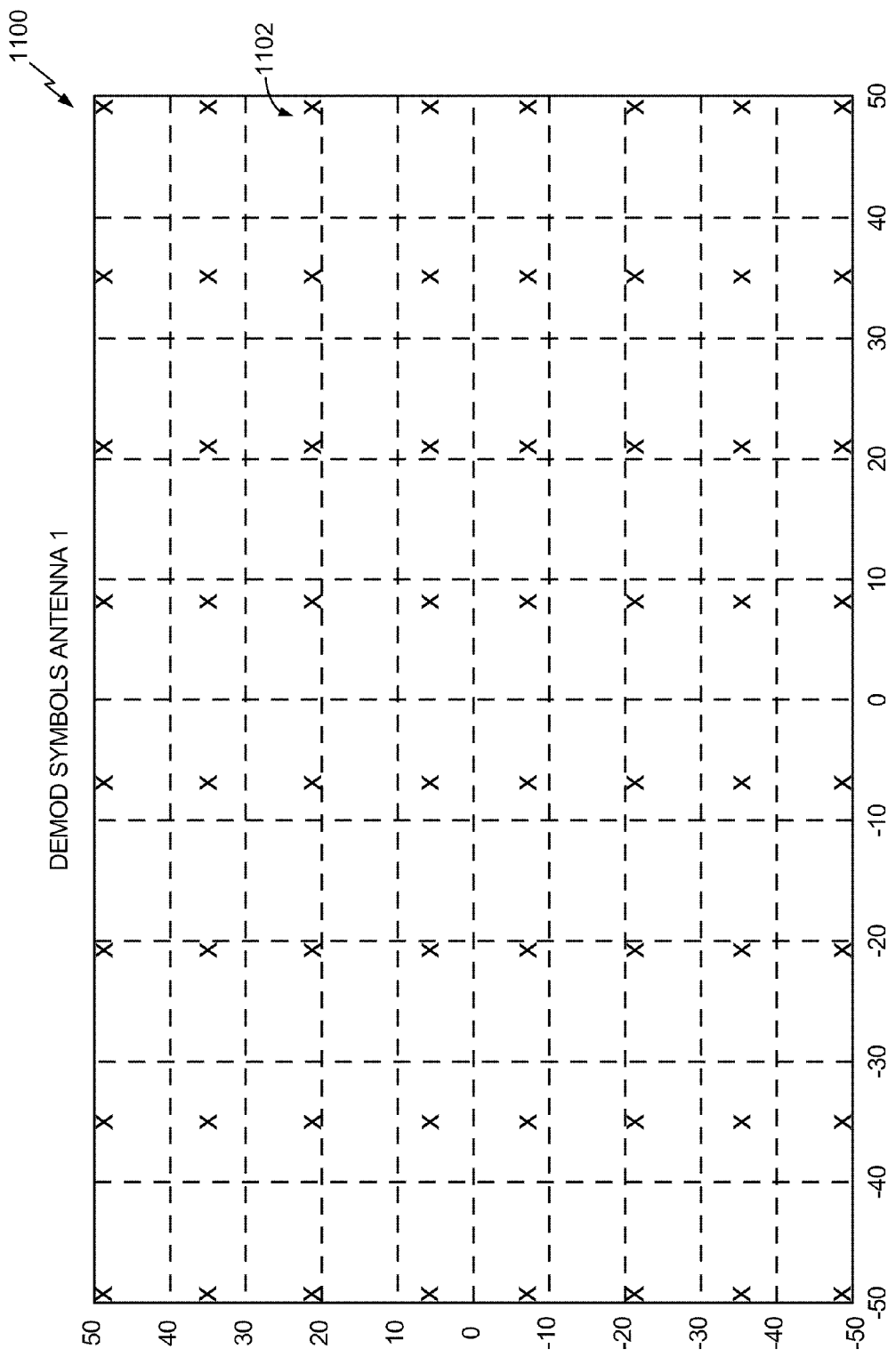
FIG. 11 depicts a graphical plot for orthogonality in frequency domain of demodulation symbols for the signals of FIG. 10.

In FIG. 10, graphical plots 1000, 1002 of spread spectrum after Walsh spreading for z1 signal 1004 and its Fast Fourier Transform (FFT) 1006 and for z2 signal 1008 and its FFT 1010. As shown, the spectrum of the signals does not move, rather only observation window size is increased and weighted by FFT(WH). In FIG. 11, a graphical plot 1100 depicts the orthogonality in frequency domain of demodulation symbols 1102 for one of the antennas is depicted.

Figure 12:
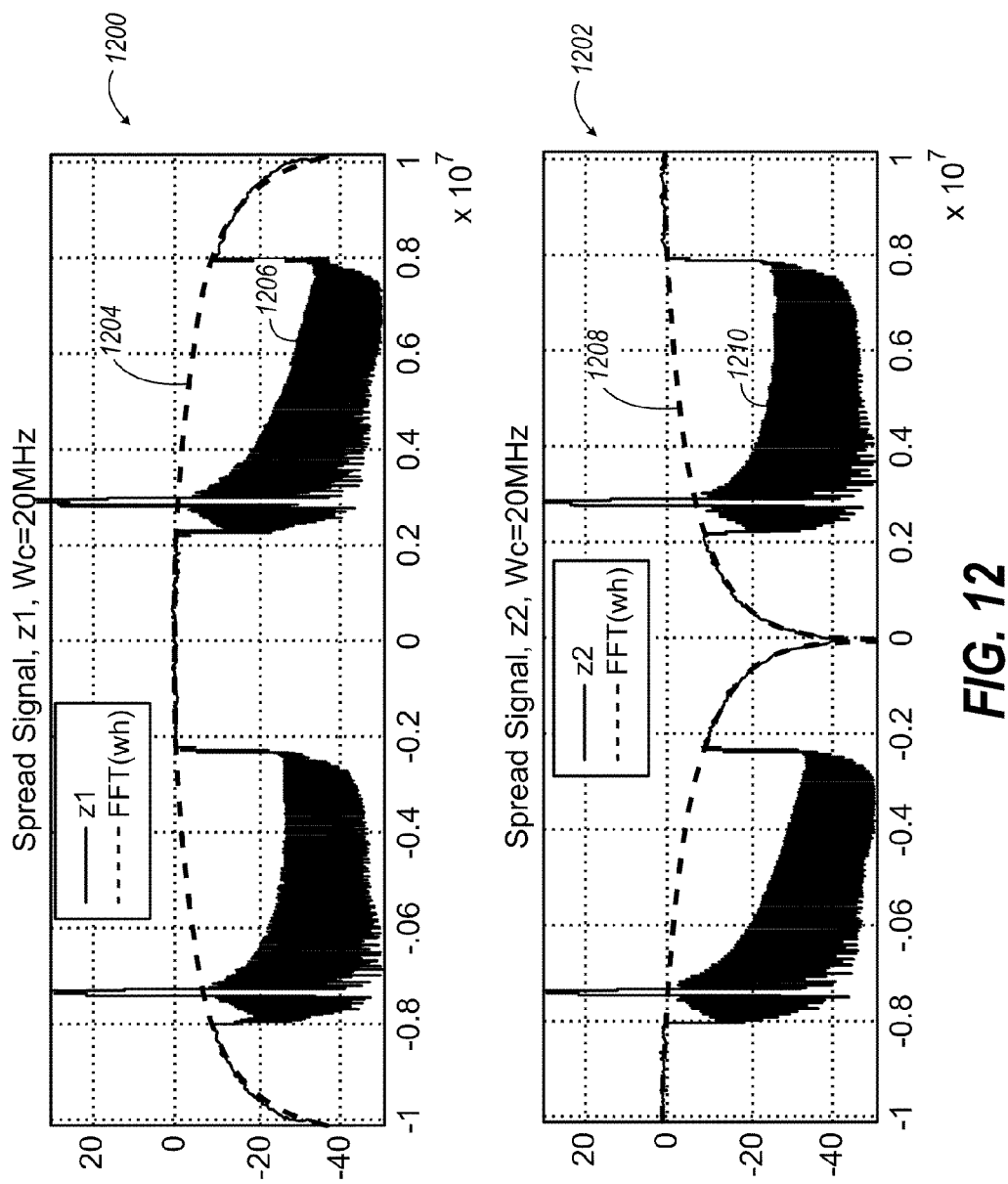
FIG. 12 depicts graphical plots of spread spectrum after Walsh spreading for z1 signal its FFT and for z2 signal and its FFT with a jamming signal.
Figure 13:
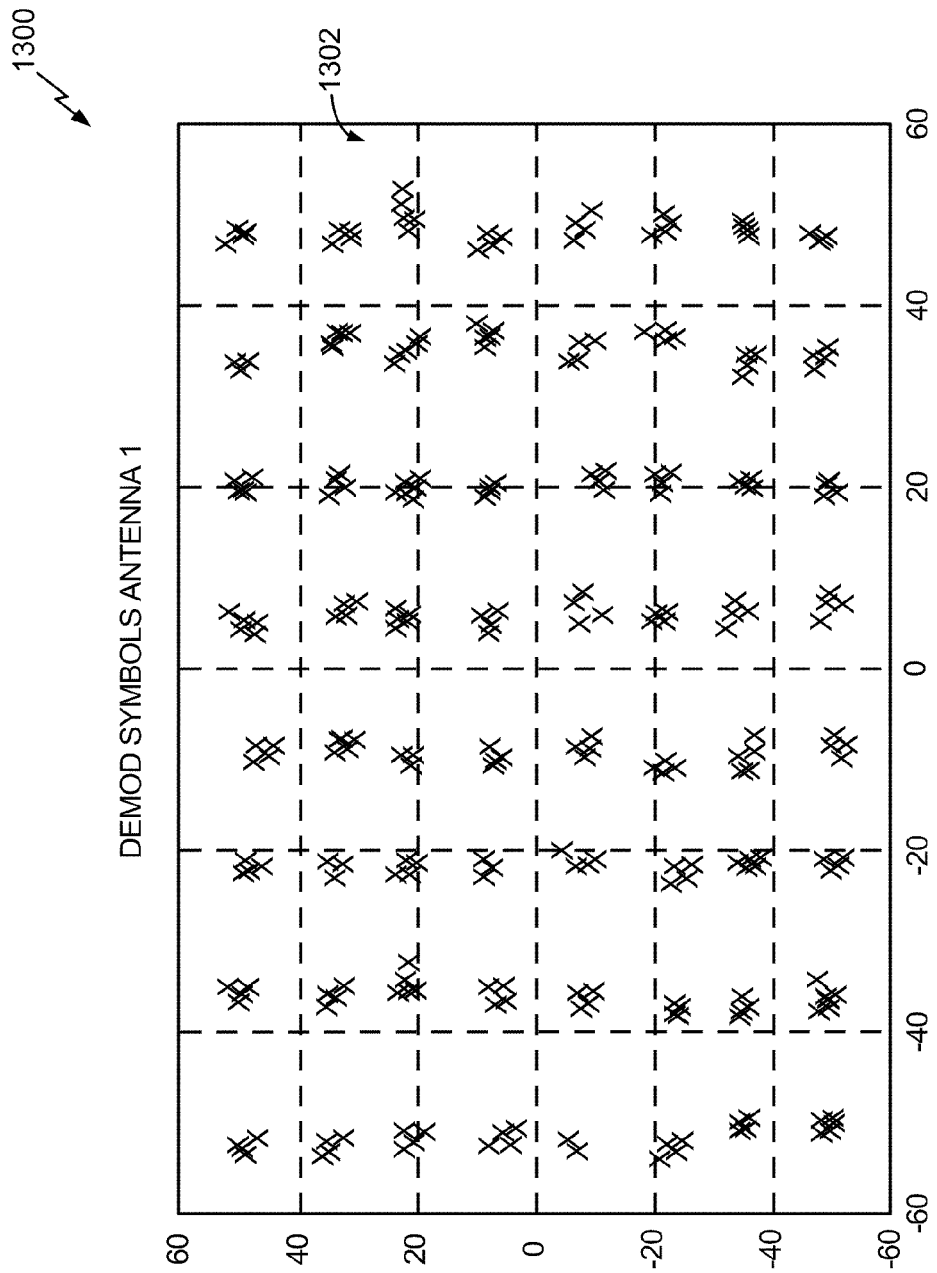
FIG. 13 depicts a graphical plot of orthogonality in frequency domain of demodulation symbols for the signals of FIG. 12.

In FIG. 12, graphical plots 1200, 1202 of spread spectrum after Walsh spreading for z1 signal 1204 and its Fast Fourier Transform (FFT) 1206 and for z2 signal 1208 and its FFT 1210 with a jamming signal. As shown, the jammer does not move and no leakage is observed. In FIG. 13, a graphical plot 1300 depicts the orthogonality in frequency domain of demodulation symbols 1302 for one of the antennas is depicted. Constellation is depicted as being noisier due to filter decimation effect in Matlab that was used to perform the simulation.

Figure 14:
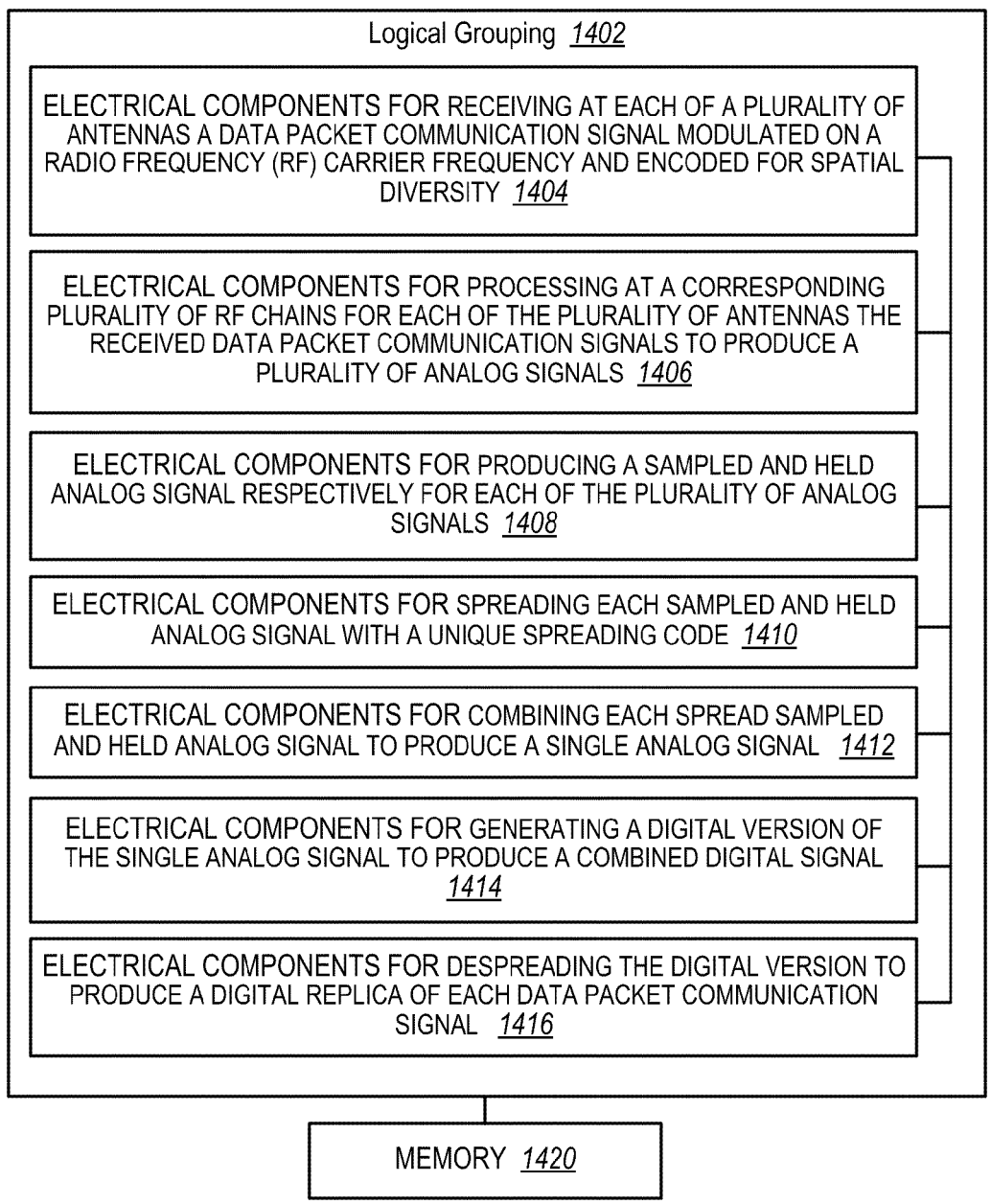
FIG. 14 depicts a block diagram for a system containing logical groupings of electrical components for receiving wireless communication at a plurality of receive antennas.

With reference to FIG. 14, illustrated is a system 1400 for receiving wireless communication at a plurality of receive antennas. For example, system 1400 can reside at least partially within a base station. It is to be appreciated that system 1400 is represented as including functional blocks, which can be functional blocks that represent functions implemented by a computing platform, processor, software, or combination thereof (e.g., firmware). System 1400 includes a logical grouping 1402 of electrical components that can act in conjunction. For instance, logical grouping 1402 can include an electrical component for receiving at each of a plurality of antennas a data packet communication signal modulated on a radio frequency (RF) carrier frequency and possibly but not necessarily encoded for spatial diversity 1404. Moreover, logical grouping 1402 can include an electrical component for processing at a corresponding plurality of receive chains for each of the plurality of antennas the received data packet communication signals to produce a plurality of analog signals 1406. Further, logical grouping 1402 can include an electrical component for producing a sampled and held analog signal respectively for each of the plurality of analog signals 1408. Logical grouping 1402 can include an electrical component for spreading each sampled and held analog signal with a unique spreading code 1410. Moreover, logical grouping 1402 can include an electrical component for combining each spread sampled and held analog signal to produce a single analog signal 1412. In addition, logical grouping 1402 can include an electrical component for generating a digital version of the single analog signal to produce a combined digital signal 1414. Logical grouping 1402 can include an electrical component for spreading each sampled and held analog signal with a unique spreading code 1416. Additionally, system 1400 can include a memory 1420 that retains instructions for executing functions associated with electrical components 1404-1416. While shown as being external to memory 1420, it is to be understood that one or more of electrical components 1404-1416 can exist within memory 1420.

Figure 15:
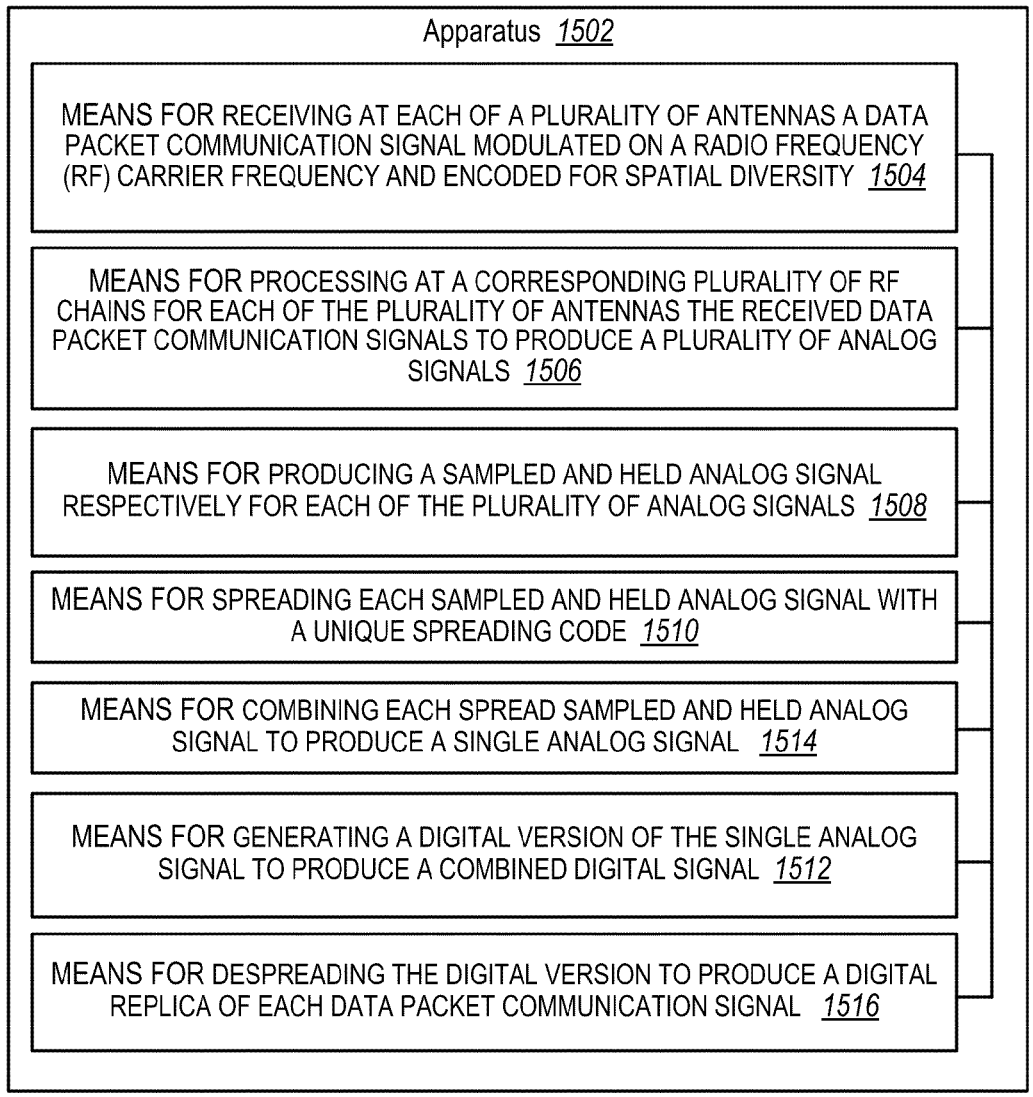
FIG. 15 depicts a block diagram for an apparatus having means for receiving wireless communication at a plurality of receive antennas.

With reference to FIG. 15, an apparatus 1502 is provided for receiving wireless communication at a plurality of receive antennas. Means 1504 are provided for receiving at each of a plurality of antennas a data packet communication signal modulated on a radio frequency (RF) carrier frequency and possibly but not necessarily encoded for spatial diversity. Means 1506 are provided for processing at a corresponding plurality of receive chains for each of the plurality of antennas the received data packet communication signals to produce a plurality of analog signals. Means 1508 are provided for producing a sampled and held analog signal respectively for each of the plurality of analog signals. Means 1510 are provided for spreading each sampled and held analog signal with a unique spreading code. Means 1512 are provided for combining each spread sampled and held analog signal to produce a single analog signal. Means 1514 are provided for generating a digital version of the single analog signal to produce a combined digital signal. Means 1516 are provided for despreading the digital version to produce a digital replica of each data packet communication signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for receiving wireless communication at a plurality of receive antennas, comprising:
   receiving at each of a plurality of antennas a data packet communication signal modulated on a radio frequency (RF) carrier frequency;
   processing at a corresponding plurality of receive chains for each of the plurality of antennas the received data packet communication signals to produce a plurality of analog signals;
   producing a sampled and held analog signal respectively for each of the plurality of analog signals;
   mixing each sampled and held analog signal with a unique spreading signal resulting in an analog signal that is orthogonal to other sampled and held analog signals mixed respectively with other unique spreading signals;
   multiplexing the plurality of orthogonal analog signals by combining each of the plurality of orthogonal analog signals to produce a single analog signal;
   generating a digital version of the single analog signal to produce a combined digital signal; and
   despreading the digital version to produce a digital replica of each data packet communication signal.

2. The method of claim 1, further comprising spreading and de-spreading with a Walsh code of code length selected for a number of receive antennas.

3. The method of claim 1, further comprising producing the plurality of analog signals by demodulating to base band frequency prior to producing each sampled and held analog signal.

4. The method of claim 1, further comprising producing the plurality of analog signals by demodulating to an intermediate frequency (IF) prior to producing each sampled and held analog signal.

5. The method of claim 4, further comprising:
   passing the single analog signal through an IF surface acoustic wave (SAW) filter and an amplifier prior to generating the digital version at an analog-to-digital converter (ADC); and
   passing the digital version from the ADC through a numerically controlled oscillator (NCO) and digital low pass filter (LPF) prior to despreading by a bank of digital correlators.

6. The method of claim 1, further comprising producing the plurality of analog signals by producing each sampled and held analog signal remaining modulated at the RF carrier frequency.

7. The method of claim 6, further comprising processing at the corresponding plurality of receive chains for each of the plurality of antennas the received data packet communication signals to produce the plurality of analog signals by low-noise amplification and band-pass filtering.

8. The method of claim 6, further comprising:
   passing the single analog signal through a radio-frequency (RF) to intermediate frequency (IF) demodulator, an IF surface acoustic wave (SAW) filter, and an amplifier prior to generating the digital version at an analog-to-digital converter (ADC); and
   passing the digital version from the ADC through a numerically controlled oscillator (NCO) and digital low pass filter (LPF) prior to despreading by a bank of digital correlators.

9. The method of claim 1, further comprising receiving signals impinging at respective antennas that were encoded for spatial diversity.

10. The method of claim 1, further comprising mixing each sampled and held analog signal with a unique spreading signal generated by a respective frequency synthesizer resulting in a frequency division multiplexed (FDM) analog signal that is orthogonal to other sampled and held analog signals mixed respectively with another unique FDM spreading signal.

11. The method of claim 1, further comprising mixing each sampled and held analog signal with a unique spreading signal generated by buffering in accordance with a time division multiplexing (TDM) code resulting in a TDM analog signal that is orthogonal to other sampled and held analog signals mixed respectively with another unique TDM spreading signal.

12. An apparatus for receiving wireless communication at a plurality of receive antennas, comprising:
  means for receiving at each of a plurality of antennas a data packet communication signal modulated on a radio frequency (RF) carrier frequency;
  means for processing at a corresponding plurality of receive chains for each of the plurality of antennas the received data packet communication signals to produce a plurality of analog signals;
  means for producing a sampled and held analog signal respectively for each of the plurality of analog signals;
  means for mixing each sampled and held analog signal with a unique spreading signal resulting in an analog signal that is orthogonal to other sampled and held analog signals mixed respectively with other unique spreading signals;
  means for multiplexing the plurality of orthogonal analog signals by combining each of the plurality of orthogonal analog signals to produce a single analog signal;
  means for generating a digital version of the single analog signal to produce a combined digital signal; and
  means for despreading the digital version to produce a digital replica of each data packet communication signal.

13. The apparatus of claim 12, further comprising means for spreading and de-spreading with a Walsh code of code length selected for a number of receive antennas.

14. The apparatus of claim 12, further comprising means for producing the plurality of analog signals by demodulating to base band frequency prior to producing each sampled and held analog signal.

15. The apparatus of claim 12, further comprising means for producing the plurality of analog signals by demodulating to an intermediate frequency (IF) prior to producing each sampled and held analog signal.

16. The apparatus of claim 15, further comprising:
  means for passing the single analog signal through an IF surface acoustic wave (SAW) filter and an amplifier prior to generating the digital version at an analog-to-digital converter (ADC); and
  means for passing the digital version from the ADC through a numerically controlled oscillator (NCO) and digital low pass filter (LPF) prior to despreading by a bank of digital correlators.

17. The apparatus of claim 12, further comprising means for producing the plurality of analog signals by producing each sampled and held analog signal remaining modulated at the RF carrier frequency.

18. The apparatus of claim 17, further comprising means for processing at the corresponding plurality of receive chains for each of the plurality of antennas the received data packet communication signals to produce the plurality of analog signals by low-noise amplification and band-pass filtering.

19. The apparatus of claim 17, further comprising:
  means for passing the single analog signal through a radio-frequency (RF) to intermediate frequency (IF) demodulator, an IF surface acoustic wave (SAW) filter, and an amplifier prior to generating the digital version at an analog-to-digital converter (ADC); and
  means for passing the digital version from the ADC through a numerically controlled oscillator (NCO) and digital low pass filter (LPF) prior to despreading by a bank of digital correlators.

20. The apparatus of claim 12, further comprising means for receiving signals impinging at respective antennas that were encoded for spatial diversity.

21. The apparatus of claim 12, further comprising means for mixing each sampled and held analog signal with a unique spreading signal generated by a respective frequency synthesizer resulting in a frequency division multiplexed (FDM) analog signal that is orthogonal to other sampled and held analog signals mixed respectively with another unique FDM spreading signal.

22. The apparatus of claim 12, further comprising means for mixing each sampled and held analog signal with a unique spreading signal generated by buffering in accordance with a time division multiplexing (TDM) code resulting in a TDM analog signal that is orthogonal to other sampled and held analog signals mixed respectively with another unique TDM spreading signal.

23. An apparatus for receiving wireless communication at a plurality of receive antennas, comprising:
  a plurality of receivers for receiving data packet communication signals modulated on a radio frequency (RF) carrier frequency;
  a plurality of receive chains corresponding to the plurality of antennas for processing the received data packet communication signals to produce a plurality of analog signals;
  one of a plurality of sample and hold circuitry for producing a sampled and held analog signal respectively for each of the plurality of analog signals;
  a spreading component for mixing each sampled and held analog signal with a unique spreading signal resulting in an analog signal that is orthogonal to other sampled and held analog signals mixed respectively with other unique spreading signals;
  a summer for combining each of the plurality of orthogonal analog signals to produce a single analog signal;
  an analog-to-digital converter (ADC) for generating a digital version of the single analog signal to produce a combined digital signal; and
  a bank of demultiplexers for despreading the digital version to produce a digital replica of each data packet communication signal.

24. The apparatus of claim 23, wherein the bank of demultiplexers comprises a bank of correlators for demultiplexing code division multiplexed (CDM) signals.

25. The apparatus of claim 23, further comprising an RF to baseband demodulator for producing the plurality of analog signals prior to producing each sampled and held analog signal.

26. The apparatus of claim 23, further comprising a radio frequency to intermediate frequency (IF) demodulator for producing the plurality of analog signals prior to producing each sampled and held analog signal.

27. The apparatus of claim 26, further comprising:
an IF surface acoustic wave (SAW) filter for receiving the single analog signal;
an amplifier for amplifying an output from the IF SAW filter and for passing the output to the ADC;
a numerically controlled oscillator (NCO) controlled by the output from the ADC;
a digital low pass filter (LPF) that filters an output from the NCO; and
a bank of digital correlators that despreads an output from the LPF.

28. The apparatus of claim 23, wherein the plurality of receive chains is further for producing the plurality of analog signals by producing each sampled and held analog signal remaining modulated at the RF carrier frequency.

29. The apparatus of claim 28, further comprising a low pass amplifier and band-pass filter for processing the received data packet communication signals to produce the plurality of analog signals.

30. The apparatus of claim 28, further comprising:
a radio-frequency (RF) to intermediate frequency (IF) demodulator for receiving and demodulating the single analog signal;
an IF surface acoustic wave (SAW) filter for receiving an output of the RF to IF demodulator;
an amplifier for amplifying an output from the IF SAW filter and for passing the output to the ADC; and
a numerically controlled oscillator (NCO) controlled by the output from the ADC; and
a digital low pass filter (LPF) that filters an output from the NCO; and
a bank of digital correlators that despreads an output from the LPF.

31. The apparatus of claim 23, wherein the plurality of antennas are further for receiving signals encoded for spatial diversity.

32. The apparatus of claim 23, further comprising:
a frequency synthesizer for each receive chain; and
a mixer for each receive chain for mixing each sampled and held analog signal with a unique spreading signal generated by a respective frequency synthesizer resulting in a frequency division multiplexed (FDM) analog signal that is orthogonal to other sampled and held analog signal mixed respectively with another unique FDM spreading signal.

33. The apparatus of claim 23, further comprising:
a buffer for each receive chain; and
a mixer for each receive chain for mixing each sampled and held analog signal with a unique spreading signal generated by buffering in the buffer in accordance with a time division multiplexing (TDM) code resulting in a TDM analog signal that is orthogonal to other sampled and held analog signals mixed respectively with another unique TDM spreading signal.

34. A computer program product, comprising a non-transitory computer-readable medium comprising:
code for causing a processor to receive a data packet communication signal modulated on a radio frequency (RF) carrier frequency;
code for causing the processor to process the received data packet communication signals to produce a plurality of analog signals;
code for causing the processor to produce a sampled and held analog signal respectively for each of the plurality of analog signals;
code for causing the processor to mix each sampled and held analog signal with a unique spreading signal resulting in an analog signal that is orthogonal to other sample and hold analog signals mixed respectively with other unique spreading signals;
code for causing the processor to multiplex the plurality of orthogonal analog signals by combining each of the plurality of orthogonal analog signals to produce a single analog signal;
code for causing the processor to generate a digital version of the single analog signal to produce a combined digital signal; and
code for causing the processor to despread the digital version to produce a digital replica of each data packet communication signal.

* * * * *